Jan. 10, 1928.  1,655,684
J. E. TROUST
MACHINE FOR FEEDING AND SHAPING ARTICLES
Original Filed April 22, 1922   6 Sheets-Sheet 1

INVENTOR
Jesse E. Troust,
BY
Duell, Warfield & Duell.
ATTORNEY

Jan. 10, 1928.

J. E. TROUST 1,655,684

MACHINE FOR FEEDING AND SHAPING ARTICLES

Original Filed April 22, 1922     6 Sheets-Sheet 4

INVENTOR
Jesse E. Troust,
BY
ATTORNEY

Jan. 10, 1928.
J. E. TROUST
1,655,684
MACHINE FOR FEEDING AND SHAPING ARTICLES
Original Filed April 22, 1922    6 Sheets-Sheet 5
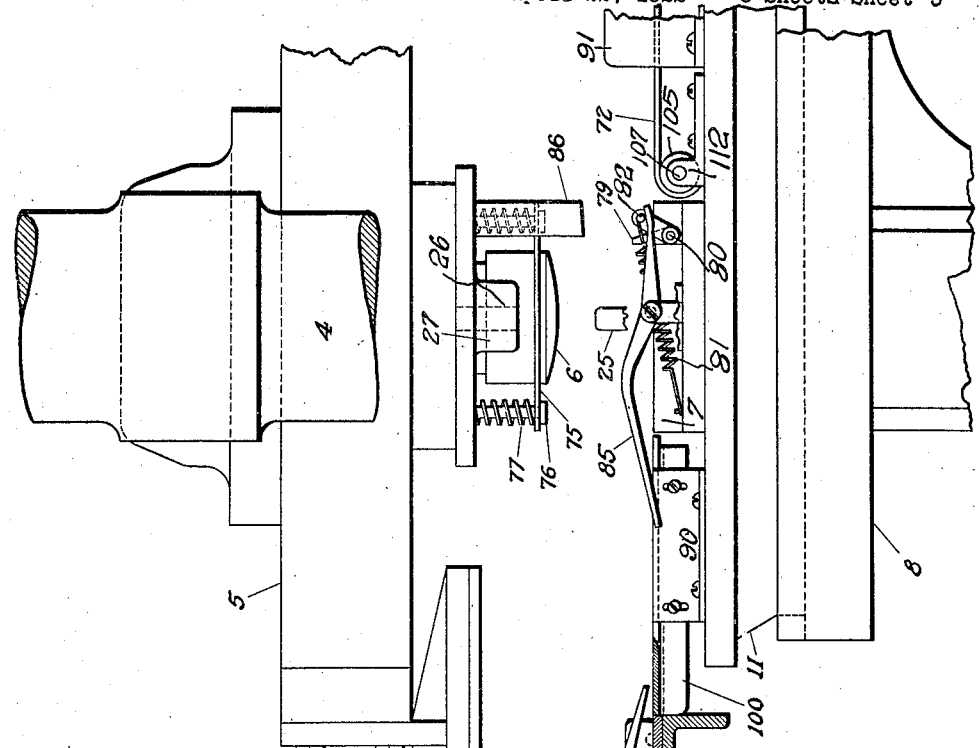
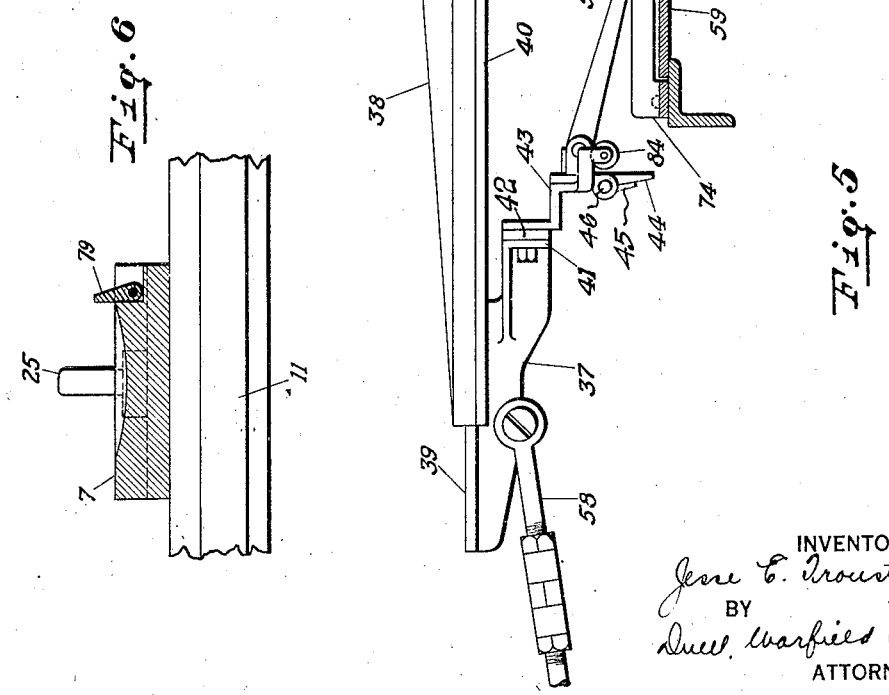
INVENTOR
Jesse E. Troust
BY
ATTORNEY

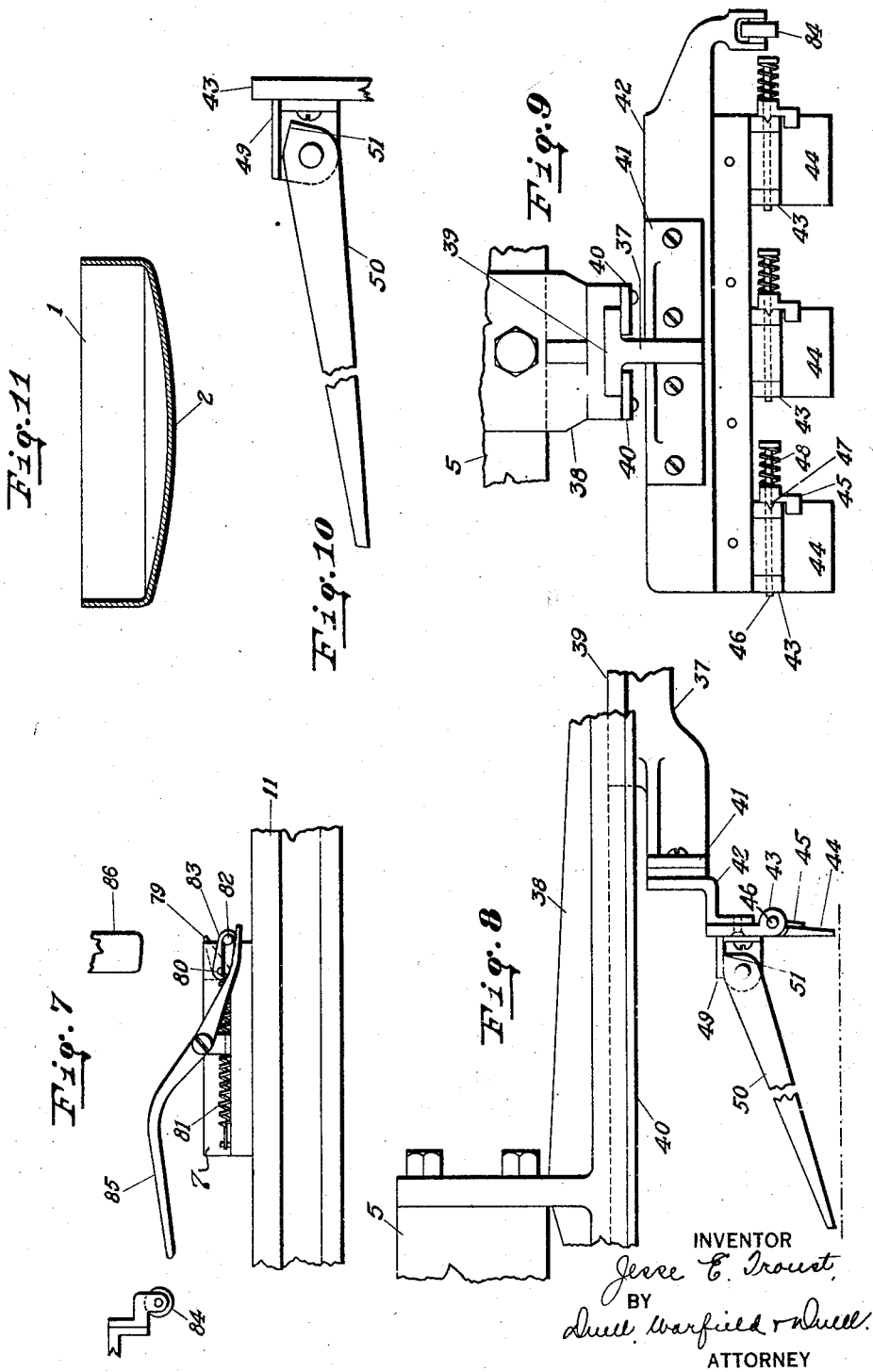

Patented Jan. 10, 1928.

1,655,684

UNITED STATES PATENT OFFICE.

JESSE E. TROUST, OF BUFFALO, NEW YORK, ASSIGNOR TO F. N. BURT COMPANY, LIMITED, OF TORONTO, ONTARIO, CANADA, A CORPORATION OF ONTARIO.

MACHINE FOR FEEDING AND SHAPING ARTICLES.

Application filed April 22, 1922, Serial No. 556,115. Renewed June 10, 1927.

This invention relates to machines for shaping and forming articles and with respect to its more specific features to mechanism for automatic feed and control of articles to be operated upon by such machines.

One of the objects of this invention is to provide a simple machine of this type in which the operations are performed automatically.

It is an object to provide an efficient machine of this character which may be operated at high speed.

Another object is to provide improved power operated means for feeding articles to the machine.

Still another object is to provide simple and positive means in such a machine for discharging and removing the finished product therefrom.

A further object is to provide an improved machine of this character in which the finished articles are positively prevented from interfering with the positioning of the articles being fed thereto.

A still further object is to provide a machine of the type stated in which articles are accurately positioned to be operated on and in which any disturbance of the articles is avoided until such operation has been completed.

An additional object is to provide a machine in which means is set up for gauging the position of articles to be shaped and in which this means is automatically removed after such shaping to permit free removal of the completed articles.

The present invention also contemplates as one of its objects to provide an efficient means for disengaging the articles from the mechanism by which the same are manipulated.

Other objects will be in part obvious and in part described hereinafter.

The invention accordingly consists in the features of construction, combinations of elements and arrangements of parts which will be exemplified in the construction hereinafter set forth, and the scope of their application will appear in the appended claims.

Figure 1:
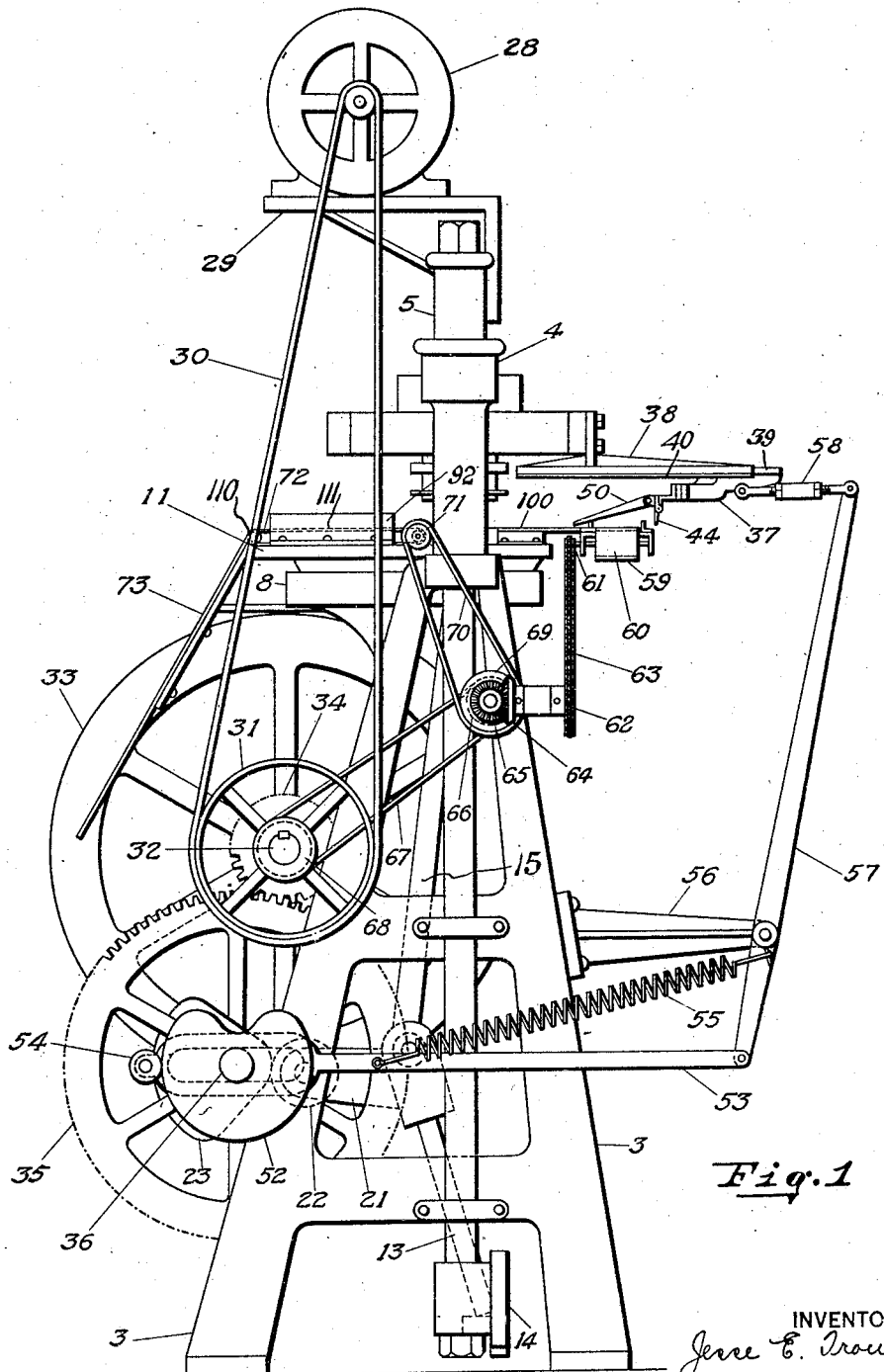

In the accompanying drawings forming a part of this specification, and in which similar reference characters refer to similar parts throughout the several views, Figure 1 is a side elevation of a machine embodying the improved construction of the present invention and having certain parts of the toggle mechanism omitted.

Figure 2:
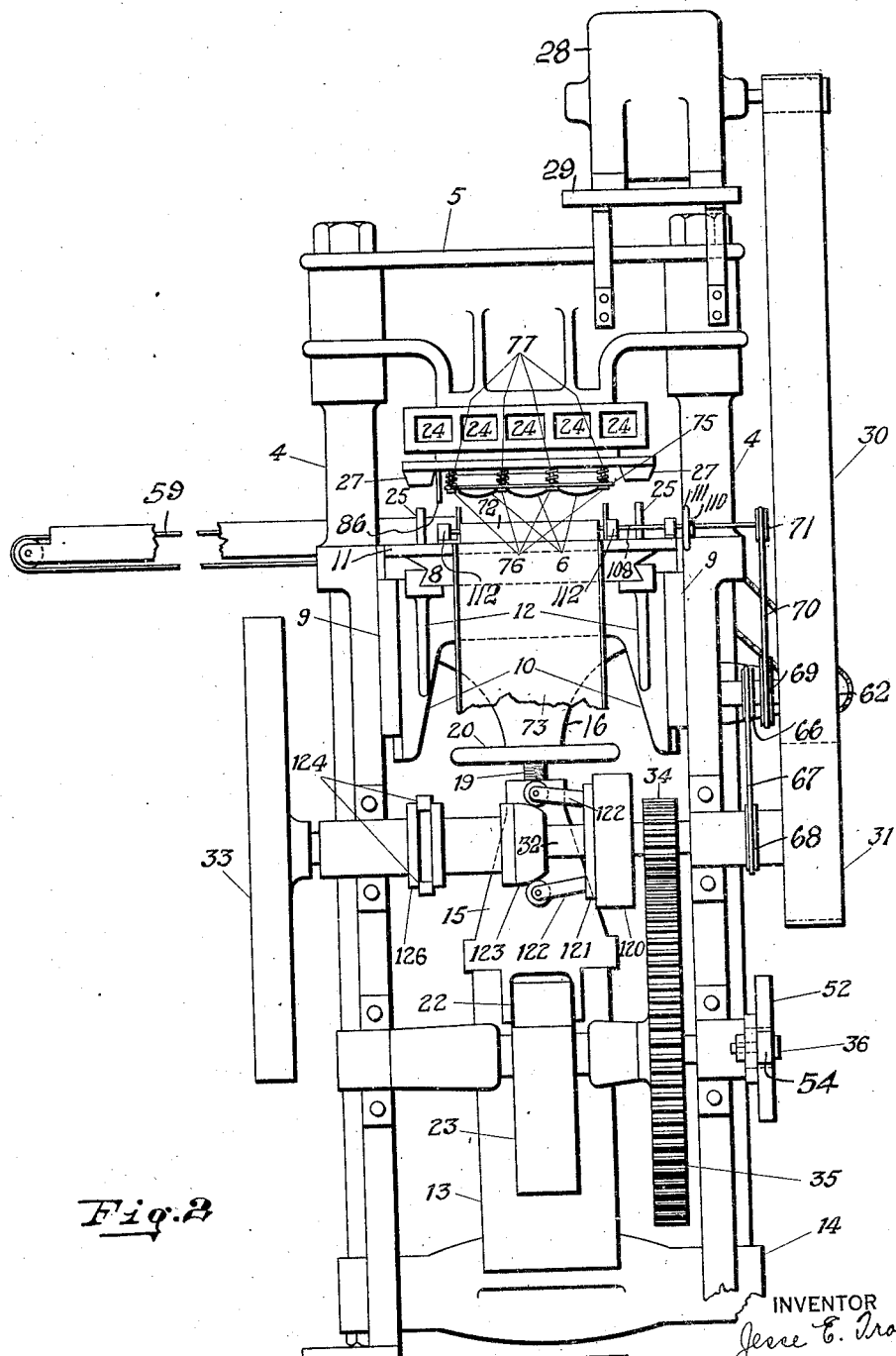
Figure 3:
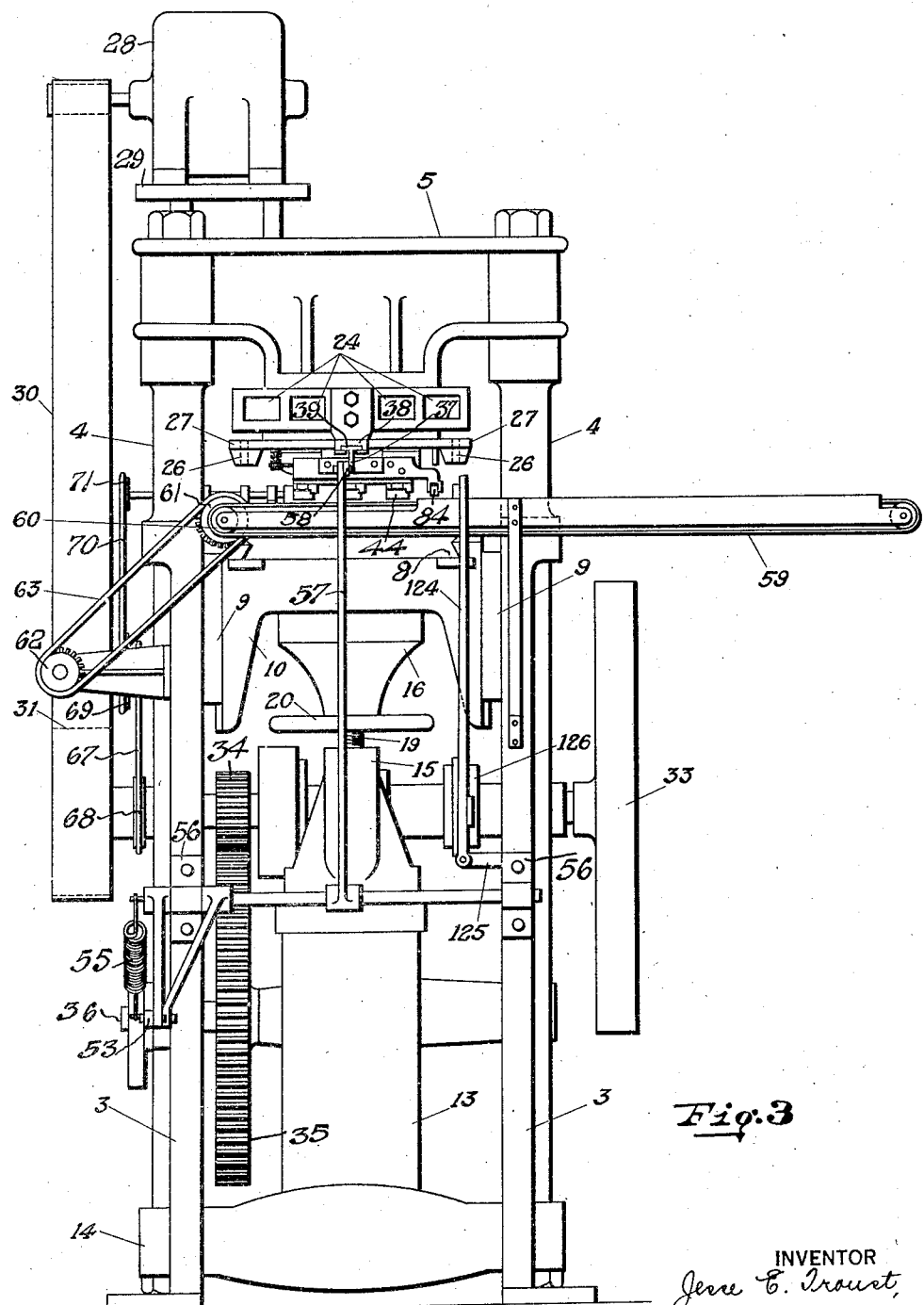
Figure 4:
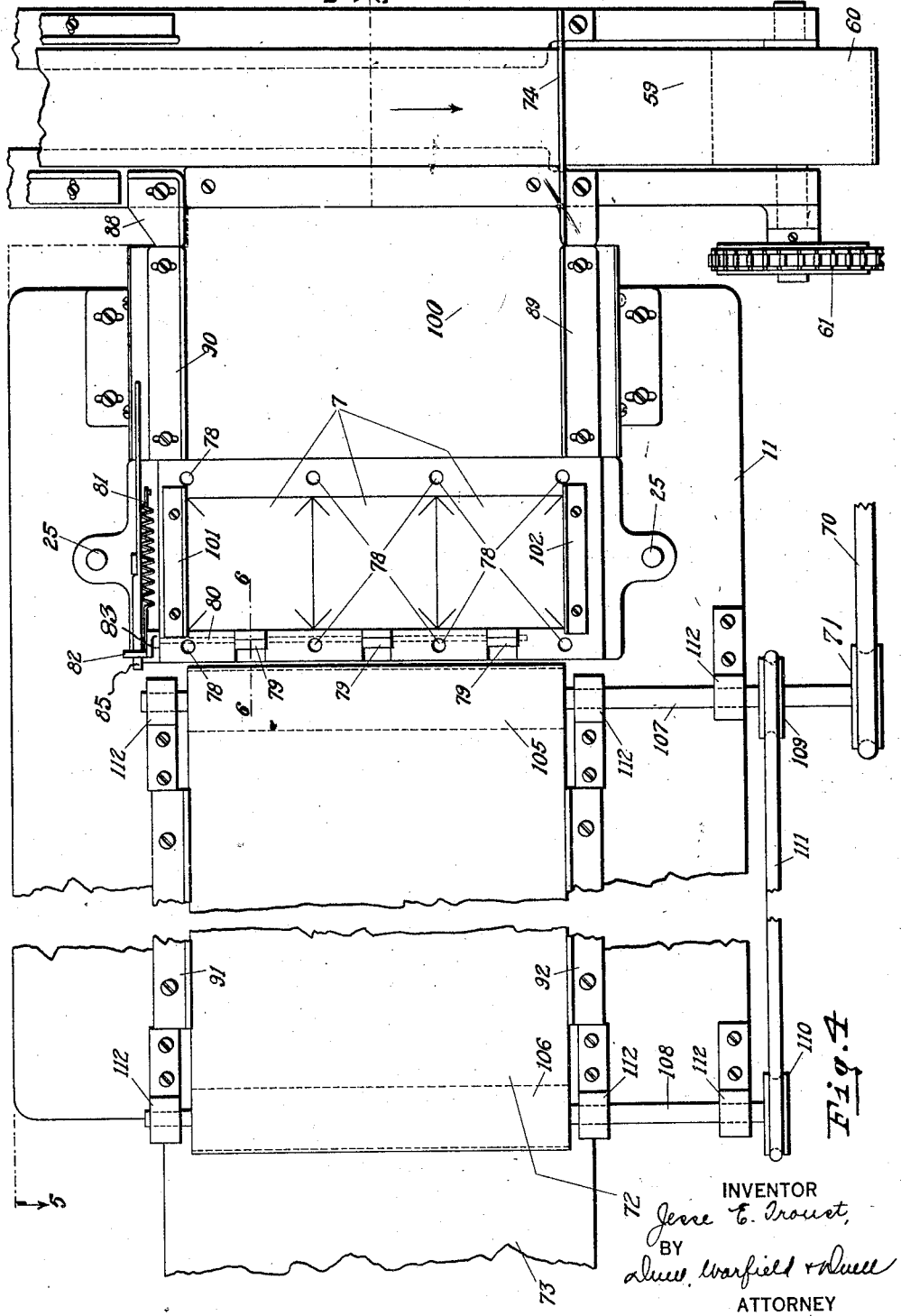

Fig. 2 is a rear view of the device as illustrated in Fig. 1, but showing the portions omitted in the previous view, and further illustrating in a somewhat exaggerated manner the position of certain of the parts of the driving mechanism, Fig. 3 is a view showing the opposite end of the machine, Fig. 4 is a plan view of the machine bed, Fig. 5 is an enlarged fragmentary, sectional view taken along the lines 5—5 and in the direction of arrows indicated in Fig. 4, Fig. 6 is a similarly enlarged view taken along lines 6—6 of Fig. 4, Fig. 7 is a fragmentary side elevation of the gauge operating mechanism, Fig. 8 is a similar view of the feed mechanism utilized, Fig. 9 is a fragmentary end view of the mechanism shown in the preceding figure, Fig. 10 shows one of the discharging elements, and Fig. 11 is a sectional view of one type of article which may be formed by a machine of the present construction.

In the present embodiment, the invention has been illustrated as being in the nature of a forming machine such as is to be utilized in connection with the shaping of receptacle covers or bodies. Primarily, this machine is employed for the doming of receptacle parts and the mechanism includes units for efficiently feeding the articles to be operated upon through and from the machine, and in such feeding, to properly correlate these articles with the improved shaping or forming mechanism.

It is to be understood, however, that this illustration is merely by way of exemplification and that the aforesaid units might be employed to advantage in machines of numerous different characters and the mechanisms for accomplishing the shaping of the articles might also be changed to render them applicable for use with different types of articles.

The problem solved by the invention as exemplified in the present machine, involves the doming of receptacle bodies or closures substantially square, each, as in Fig. 11, including side walls 1 and a head or base 2, the latter being operated on by the machine in order to dome or bulge the same. Further functions achieved in the present instance by the invention are those of efficiently feeding the articles to a position at which they may be operated upon by the machine and in properly establishing and retaining these articles in such position, subsequent to which they are discharged from the shaping machinery and are in fact, automatically transported to a position beyond the machine proper.

Thus, referring to the drawings, it will be seen that the frame of the machine includes a pair of A-shaped carrying members 3 terminating in supporting columns 4 which are joined by a cross-head 5. Supported by the cross-head 5 is a set of three counter-dies 6 which are adapted to fit within the box covers 1 and in co-operation with a corresponding set of dies 7 to swell or bulge the tops of the covers from their normally flat form to the dome form as shown in Fig. 11 above referred to. Dies 7 are supported on a table 8 which is adapted to reciprocate vertically in the grooves of the slides 9 supported by frame of the machine. Table 8 may embrace a U-shaped piece 10 which moves in the grooves of slides 9, and also includes a platform 11, and two retaining members 12 by which the set of dies is held within a recess in the platform 11. A shelf 100 is mounted on platform 11 and lies flush with the surface of dies 7 to provide a smooth unobstructed path thereto. The set of dies 7 has three depressions therein to receive three box covers simultaneously and these depressions are arranged in line across the width of the line of feed as limited by platform 11. Table 8 is moved up and down under the direct force exerted by a toggle which is formed by a heavy arm 13, exerting its thrust against a cross-piece 14 of the frame, and a member 15 hinged therewith which with an additional member 16 adjustably joined thereto, forms the other arm of the toggle. Members 15 and 16 are joined by a screw 19 which is provided with a threaded hand wheel 20 by means of which the toggle arm which these members form may be lengthened or shortened in order to adjust table 8 to its proper initial elevation flush with shelf 100. Upon arm 13 is a forwardly extending arm 21 supporting a roller 22. Force exerted against roller 22 by means of a cam 23, straightens the toggle. Upon rotation of cam 23 therefore the table 8 rises and falls periodically. The time of elevation is adjusted so that the box covers will remain pressed between the dies 7 and the counter-dies 6 sufficiently long to give them a permanent dome form.

In order to insure proper centering of the counter-dies 6 within dies 7 there are provided guide pins 25 mounted on the table 8 which engage, upon reciprocatory motion of the table, with holes 26 in projecting members 27 extending laterally from the counter-dies 6 and supported by cross-head 5.

Power to rotate cam 23 is supplied from a motor 28 mounted overhead on a suitable bracket 29 on cross-head 5. The power of motor 28 is transmitted to a belt 30 and thereby to a pulley 31 mounted on a shaft 32 on which is also mounted a fly-wheel 33. A clutch operates to connect shaft 32 with a pinion 34. This clutch comprises a cylindrical shell 120 connected with pinion 34 and a cylinder 121 to fit therewithin and adapted to be expanded to clutch shell 120 by means of two arms 122. Arms 122 are spread apart at their roller ends by a cone 123 slidable on shaft 32. Cone 123 may be moved to and fro under the influence of a manually controlled lever 124 pivoted at one end to a bracket 125 on frame 3 and adapted to exert its force against a grooved member 126 which is connected with the cone 123. The movement of lever 124 from side to side as described connects or disconnects shaft 32 with pinion 34 depending upon the direction the lever is moved. Pinion 34 engages with gear 35 mounted on the shaft 36 upon which the cam 23 is also mounted.

The feeding mechanism briefly referred to above comprises a device, as the carriage 37 which reciprocates and slides in a groove of bracket 38 supported on cross-head 5. Carriage 37 has a "T" cross-section, and the flanges 39 of this element are slidably supported within the groove of the bracket 38, it being noted, as has been clearly brought out in Fig. 9, that this groove may be provided by utilizing plates 40, rigidly secured to the bracket. On carriage 37 there is provided a carrying member 41 on which is mounted plate 42. This plate supports three pairs of lugs 43 on each of which are pivotally supported similar article feeding fingers 44 which are substantially rectangular in form and usually prevented from swinging rearwardly from their normal vertical position by stops 45 mounted on pins 46 each supporting one of the fingers 44. Each stop 45 is provided with a small detent or projection 47 fitting in a corresponding groove in member 43 and held therein by a spring 48. Thus, when ordinary forces are exerted against a finger 44 and thereby against its stop 45, the tension of spring 48 is sufficient to retain the stop 45 in its normal position due to the engagement of projection 47 with the groove in extension 43. However, when extraordinary forces are exerted on finger 44 projection 47 jumps out of its groove, and stop 45 is rotated allowing finger 44 also to rotate back of its normal vertical position. Thus it is obvious that a mechanism is provided at this point, which will act to prevent articles from becoming damaged in the event that certain of the same should become jammed, it being apparent that when one of the fingers 44 does swing rearwardly, the feed at this point becomes inoperative.

Plate 42 is provided with an extension 49 upon which are pivotally mounted three depending article feeding fingers 50 disposed ahead of the fingers 44, respectively. Each finger 50 is provided with a cam-like portion 51 which engages with the extension 49 to prevent and arrest the finger 50 from dropping below a predetermined level and these fingers are arranged one in advance of each of the fingers 44 for a purpose hereinafter brought out.

Motion may be imparted to carriage 37 by a cam 52 in the present instance also carried by the shaft 36. A bifurcated rod 53 fitting about shaft 36 and slidable thereon, carries a roller 54, which is held against the periphery of cam 52 by a spring 55, one end of which is attached to the rod 53 the other end of the same being secured to a bracket 56 supported by frame 3. A lever 57, pivotally supported by bracket 56 and linked to rod 53 at one end, and at its other end, attached to a link 58 transmits the reciprocatory motion to carriage 37, upon rotation of cam 52.

Beneath the path of carriage 37 and at right angles thereto, there is provided a device automatically operative to feed the articles to predetermined position, from which position they are fed in succession by the reciprocatory device including fingers 44. This feeding device includes a belt conveyor 59 to which motion is adapted to be imparted by a roller 60, through suitable sprockets 61 and 62 connected by a chain 63. Mounted on the shaft with sprocket 62 is a bevelled gear 64 meshing with a similar driving gear 65 actuated from shaft 32, by suitable pulleys 66 and 68 connected by a belt 67.

A pulley 69 on the shaft with pulley 66 and driving gear 65 provides power through a belt 70 and pulley 71 to keep a conveyor belt 72 constantly in motion to carry away articles removed from the dies 7. Conveyor belt 72 passes over two rollers 105 and 106 mounted on shafts 107 and 108 respectively having suitable bearings 112 mounted on platform 11. Pulley 71 is mounted on shaft 107 and it is to this shaft that the power is directly applied. The movement of shafts 107 and 108 is synchronized preferably by associating pulleys 109 and 110 with the same and connecting these pulleys by means of a belt 111 so that the conveyor 72 will be moved in a satisfactory manner. This conveyor is adapted to discharge such articles onto a chute or apron 73 which may lead to a receptacle of any suitable description for collecting the formed box covers. Due to the fact, in the present instance, that the shafts carrying the pulleys 69 and 71 are connected together by means of the belt 70, the latter is made of material which is more or less elastic, since upon the raising and lowering of table 8 there is a corresponding lengthening and shortening of the distance between pulleys 69 and 71.

The accurate placing of articles in dies 7 is assured by means of a gauging mechanism which in the present embodiment embraces rockable fingers or gauge members 79 which are mounted on a shaft 80 located below the surface of dies 7. A spring 81, attached to a pin 82, on an arm 83 also keyed to shaft 80, operates to hold the shaft in proper position, either projecting upwardly as shown in Fig. 4, or below the surface of dies 7, as shown in Fig. 7. While the box covers are being removed from the dies 7, the gauge members 79 are in lowered position as shown in Fig. 7. Upon motion of carriage 37 toward dies 7, a roller 84 carried thereby presses against a curved lever 85 pivoted on a projecting portion of platform 11, and operates to rock and lift the arm 83. Spring 81 then snaps gauge members 79 into position projecting upwardly in the path of the box covers as shown in Fig. 6. The box covers or other articles being conveyed by fingers 44 are then pushed into position against gauge members 79 which operate to place them accurately for the operation of the counter-dies 6. Upon elevation of table 8, a stud 86 supported on cross-head 5 presses against pin 82 and thereby rotates shaft 80 to depress fingers 79 where they remain under the influence of spring 81.

Briefly, the machine may be said to include a set of dies and corresponding counter-dies, the counter-dies being stationary, and the dies, reciprocatory theretoward. The box covers are fed thereto by a reciprocatory mechanism while the dies and counter-dies are in their normal inoperative position and, after the shaping by the reciprocatory motion of the die members, a mechanism operates to remove the box covers therefrom. Means is set in place upon motion of the feeding mechanism to position the covers within the dies, and for preventing the covers from moving out of place, which means is removed upon the reciprocation of the die members to allow the discharging mechanism to remove the box covers from the die members.

In using a machine of the type aforedescribed, it will be understood that the articles to be shaped are deposited in any suitable manner upon the conveyor 59, and are carried thereby until the most advanced of these articles is engaged by the stop plates 74. Following articles will be moved by the conveyor until the side face or edge of each engages the adjacent face or edge of the preceding article. When this occurs, the receptacles will remain in relatively fixed positions and the conveyor in the present instance, will continue to move under the same, so that these articles are held stationary and slide over the conveyor upon reaching a position adjacent the entrance of the machine bed. During this movement of the parts, certain articles are in position to be operated upon by the co-operating dies 6 and 7, in a manner hereinafter brought out, and according to the timing of the machine units, during this operation on the articles, the carriage 37 will be moved outwardly to the position shown in Figs. 1 and 5, i. e., a position at which the fingers 44 carried thereby will move to a point beyond that row of articles which rests upon the conveyor 59.

Due to the fact that the fingers 44 are preferably made of relatively light material, these elements will not displace the articles upon the carriage 37 being moved outwardly, in that upon coming in contact with the forward faces thereof, the fingers will be rocked and slide over the upper edges of the same until they have been moved by the carriage to a point beyond the rearmost edges, i. e., a position at which they are free to swing downwardly. Upon the carriage now being moved inwardly or, in other words, towards the dies, the fingers 44 will each engage one of the row or group of articles supported by the conveyor 59 and, in the present instance, will move three of these articles in a row, or group, across the bed 100 of the machine, and so towards the dies.

Simultaneously with this movement of the articles, the bed carrying the dies 7 may move away from the head 5 of the machine, incident to the timing of the cam 23, and thus the one row of articles which has just been operated upon by the dies will be free to move to a point beyond or, in other words, to the rear of these elements.

During the continued advance of the carriage 37, the foremost fingers 50 which precede the same will each come in contact with one of the articles which has just been shaped and consequently this row of articles will be shifted to a position away from the dies 6 and 7 and delivered from the dies in a direction away from belt 59 onto the conveyor 72, from which in turn they will be discharged into a chute or apron 73 and so delivered from the machine. During these movements the articles may be guided by pairs of side members 89 and 90, and 91 and 92 respectively, and while in dieing position, guide members 101 and 102 may serve to prevent any accidental displacement of the parts.

The row of articles which has not yet been operated upon by the dies will now be brought to a position adjacent the latter incident to the continuing movement of the carriage 37 and the consequent feeding action exerted by the fingers 44 thereof, the actions of placing an article on the dies and removing another article therefrom being practically simultaneous. Upon reaching such position, the articles will be accurately disposed upon the dies 7 and in proper relation to the dies 6 incident to the gauging mechanism provided at this point. In this connection it is to be noted that as the carriage 37 moves forwardly to a point at which the articles are about to be disposed in position to be operated upon, the gauge setting member provided by the roller 84 will move into engagement with the lever 85, thus rocking the outer end of the same downwardly and consequently, swinging the rear end thereof upwardly. It will be obvious, upon this operation occurring, that the crank arm provided by the pin 82 will be moved through an arcuate path so as to rock the shaft 80 carrying the article gauging fingers 79, to bring the same into a vertical position, it being noted that during this rocking, one end of the spring 81 follows the crank arm from one side of its "dead center" position to the other side thereof, thus retaining this member in the position shown in Fig. 5 and, as a consequence, maintaining the fingers 79 in a position in which they will act as stops between the dies and the conveyor 72.

In other words, these members will act as stops in that the articles, upon their forward edges or faces reaching positions adjacent the same, will be prevented from further movement and upon this occurring, the carriage 37 will begin its retraction due to the fact that at this position the carriage has reached its limit of movement, and the actuating mechanism provided therefor begins to return the same to its initial position; it being thus understood that if the articles incident to their momentum, or for other reasons, should tend to move beyond a proper position in line with the dies, they will encounter the stops or gauge members. During this retraction the fingers 50, which are preferably constructed of relatively light material, will swing upwardly and upon coming in contact with the forward edges of the row of articles which has just been disposed in line with the dies, it is obvious that these fingers will simply slide in contact with the upper edges of the articles and drop into a position adjacent the machine bed upon the carriage being further moved towards the front end thereof.

The dies 7 will now be advanced towards the dies 6, in order to dome the heads or bases of the articles. If desired, the doming or bulging of the articles may be performed or facilitated by having this operation occur in the presence of heat. With this end in view, compartments 24 provided above the dies 6, may receive heating elements. In any event, however, it is obvious that if articles of the type shown in the present instance are to be formed, and a machine utilizing dies of the illustrated characteristics, is accordingly provided, the side walls of the articles will ride along the side faces of the dies 6 and the inner face of the base or heads of these articles will be engaged by the lower faces of the dies last mentioned, so that the outer faces of these portions will be pressed into intimate engagement with those surfaces of the dies 7 which correspond to the contour of the forming faces of the dies 6, thus permanently distorting the heads of the articles into the shape desired. During this movement of the dies, it will be understood that the movements of the machine bed may be guided incident to the use of the pins 25, which during this operation will enter the openings 26 in the members 27.

Upon the dies 7 now moving downwardly, it will be obvious that in certain instances the articles operated upon will have a tendency to cling to the dies 6 incident to the frictional contact established between the inner faces of the articles, and particluarly the side faces of these dies. With a view of overcoming this difficulty, an article stripper, as a plate 75 is provided which is mounted close alongside the dies 6 and formed with openings of a size sufficient to slidably embrace the dies 6 and this plate is mounted by attaching bolts 76 to the head 5, which bolts pass through openings in the plate. By interposing springs 77 between the under face of the head and the upper face of the plate, it is obvious that the latter will become spring-pressed and normally tend to move toward the outer ends of dies 6 to the position shown in Fig. 5. These springs, when utilized, are of insufficient strength to cause any mutilation of the articles during the movement of the dies towards each other, but are adequate to assure a discharge of the articles from the dies 6, it being, of course, understood that when the dies 7 move toward the dies 6, the plate 75 will come in contact with the upper faces of the first mentioned dies and be consequently retracted relative to the head 5, and during such retraction the bolts 76 will enter the openings 78 provided for this purpose. However, instantly upon the dies 7 moving away from the dies 6, the plate will move to its outermost limit of travel thus stripping the articles from the dies 6.

While the articles are being shaped, it is to be noted that the device or stud 86 which is alongside the counter dies will come in contact with the pin 82 of the crank arm incident to the movement of the bed of the machine towards the head thereof, and this contact will result in the pin and the shaft connected therewith, being again swung past "dead center" in which position they will be retained by the spring 81. Thus, the fingers 79 will extend in a substantially horizontal plane and will in no wise interfere with the discharge of the shaped articles. Consequently, upon the next projection of the carriage 37, the fingers 50 will come in contact with the articles and shift the same to the conveyor 72 by means of which they may be discharged from the machine, it being noted that the fingers last mentioned are arranged to move the articles from a position in line with the dies at a substantial interval in advance of the position of the articles fed by the fingers 44. Thus, no difficulty incident to overfeeding or non-setting of the gauge mechanism will be experienced during normal operation. Also it will be seen that the gauge and the lever 85, though reciprocal with the table 8, nevertheless cooperate with the gauge actuating members 84 and 86 in proper timed relation.

From the foregoing it will be appreciated that the objects of this invention are accomplished, and it will be understood that as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of invention which, as a matter of language, might be said to fall therebetween.

I claim:

1. In a machine of the character described, in combination, a shaping device, means for feeding a succession of articles to said shaping device, and means to remove the article from said shaping device at a substantial interval in advance of the positioning of the next succeeding article, which includes a finger reciprocatory in the line of feed to push the shaped article from the shaping device and pivotally mounted to slide over the positioned articles on backward motion.

2. In a machine of the character described, in combination, a shaping device, means for feeding a succession of articles and means to remove the article from said shaping device at a substantial interval in advance of the positioning of the next succeeding article, which includes a finger extending forwardly over the article being fed and adapted to push the shaped articles in advance thereof.

3. In a machine of the character described, in combination, a shaping device, means for feeding a succession of articles to said shaping device and means to remove the articles from said shaping device at a substantial interval in advance of the positioning of the next succeeding article, which includes a pivotally supported finger reciprocatory in the line of feed of the articles and adapted to push the shaped articles in advance of the articles being fed, and adapted on backward motion to slide over the positioned articles.

4. In a machine of the character described, in combination, a shaping device, means for feeding a succession of articles to said shaping device and means to remove the articles from said shaping device at a substantial interval in advance of the positioning of the next succeeding article which comprises a finger reciprocatory in the line of feed and extending forwardly over the articles being fed and adapted to push the shaped articles in advance thereof.

5. In a machine of the character described, in combination, a shaping device, means for feeding a succession of articles to said shaping device and means to remove the article from said shaping device at a substantial interval in advance of the positioning of the next succeeding article which comprises a finger reciprocatory in the line of feed and extending forwardly over the articles being fed and adapted to push the shaped articles in advance thereof, said finger being pivotally mounted and adapted on its backward motion to slide over the positioned articles.

6. In a machine of the character described, in combination, a shaping device, means for feeding a succession of articles to said shaping device and means to remove the article from said shaping device at a substantial interval in advance of the positioning of the next succeeding article which includes a pivotally supported finger extending forwardly over the articles to be fed and reciprocatory in the line of feed, said finger being adapted to push the shaped articles in advance of the articles being fed and on backward motion thereof adapted to slide over the positioned articles.

7. In a device of the character described, in combination, a shaping device, means to feed a succession of articles to said shaping device, a gauge rotatable in and out of the path of the articles and adapted to position them at the shaping device, said gauge being resiliently held in either such rotated position, and a controlling lever operable by the shaping device to remove the gauge from the path of the articles, and operable by the feeding means to replace the gauge.

8. In a device of the character described, in combination, a shaping device, means to feed a succession of articles to said shaping device, a gauge rotatable in and out of the path of the articles and adapted to position them for the shaping device, and a pivotally supported finger reciprocatory in the line of feed and adapted to push the shaped articles in advance of the articles being fed and adapted on backward motion to slide over the positioned articles.

9. In a device of the character described, in combination, a shaping device, means to feed a succession of articles to said shaping device, a gauge rotatable in and out of the path of the articles and adapted to position them at the shaping device, said gauge being resiliently held in either such rotated position, a controlling lever operable by the shaping device to remove the gauge from the path of the articles and operable by the feeding means to replace the gauge, and a pivotally supported finger extending forwardly over the articles to be fed and reciprocatory in the line of feed, said finger being adapted to push the shaped article in advance of the articles being fed and on backward motion thereof adapted to slide over the positioned articles.

10. In a machine of the character described, a shaping device comprising a die and a counter-die, means to feed an article to said shaping device, a gauge rotatable in and out of the path of the articles and adapted to position them for the shaping device, said gauge being resiliently held in either such position, a controlling lever operable by the shaping device to remove the gauge from the path of the articles and operable by the feeding means to replace the gauge, a member fitting closely about the counter-die and slidable thereon to engage the article, resilient means to actuate said member to strip the article from said counter-die, and a finger reciprocatory in the line of feed and extending forwardly over the article being fed and adapted to push the shaped articles in advance thereof, said finger being pivotally mounted and adapted on backward motion to slide over the positioned articles.

11. In a machine of the character described, a shaping device comprising a die and a counter-die, means to feed an article to said shaping device, a gauge rotatable in and out of the path of the articles and adapted to position them for the shaping device, said gauge being resiliently held in either such position, a controlling lever operable by the shaping device to remove the gauge from the path of the articles and operable by the feeding means to replace the gauge, a member fitting closely about the counter-die and slidable thereon to engage the article, resilient means to actuate said member to strip the article from said counter-die, a finger reciprocatory in the line of feed and extending forwardly over the article being fed and adapted to push the shaped articles in advance thereof, said finger being pivotally mounted and adapted on backward motion to slide over the positioned articles, and a conveyor belt to remove the articles pushed from the shaping device by said finger.

12. In a machine of the character described, a frame, a counter-die rigidly supported thereby, a die co-operative therewith, a table supporting said die and slidably supported by said frame, a carriage supported by said frame and adapted to reciprocate across said table, a plurality of fingers supported by said carriage, certain of said fingers being adapted to advance the articles to a position between said die and said counter-die and other of said fingers being adapted to remove such articles beyond said die, and power means to operate said die and said carriage.

13. In a machine of the character described, a frame, a counter-die rigidly supported thereby, a die co-operative therewith, a table supporting said die and slidably supported on said frame, a carriage supported by said frame and adapted to reciprocate across said table, a plurality of fingers supported by said carriage, certain of said fingers being adapted to advance the articles to position between said die and said counter-die, other of said fingers being adapted to remove such articles beyond said die, a gauge member for the articles rotatably supported by, and projectable above, said table, a member actuated by said carriage and said counter-die to rotate said gauge member to and from its projecting position, and power means to operate said die and said carriage.

14. In a machine of the character dedescribed, in combination, a shaping device, gauging means adjacent the same, means for moving said gauging means into and out of operative position, said gauging means being in operative position during the association of said articles with said shaping device and being in inoperative position during the removal of said articles therefrom.

15. In a machine of the character described, in combination, a shaping device, article feeding means including a carriage and an article engaging finger movably mounted upon said carriage.

16. In a machine of the character described, in combination, a shaping device, means for moving articles relative thereto, said means including a carriage, a finger mounted upon said carriage and means for moving said carriage relative to said shaping device, said finger in certain instances being adapted to move in a path beyond the articles to be fed thereby.

17. In a machine of the character described, in combination, a shaping device, means for moving articles relative thereto, said means including a carriage, a finger mounted upon said carriage and means for moving said carriage relative to said shaping device, said finger being adapted to move in a path above the articles to be fed thereby and being engageable with one of said articles during certain of its movements.

18. In a machine of the character described, in combination, a shaping device, means for feeding articles relative thereto, said feeding means including a carriage, and a finger rockingly mounted upon said carriage.

19. In a machine of the character described, in combination, a shaping device, means for feeding articles relative thereto, said feeding means including a carriage, means for positioning an article below said carriage, and a finger secured to and extending below said carriage to engage said article.

20. In a machine of the character described, in combination, a shaping device, means for feeding articles relative thereto, said feeding means including a carriage, means for positioning an article below said carriage, and a finger rockingly secured to and extending below said carriage to engage said article.

21. In a machine of the character described, in combination, a shaping device, means for feeding articles relative thereto, said means including a movable carriage, means for positioning articles below said carriage, means extending from said carriage for moving articles to be manipulated toward said shaping device and means for engaging the shaped articles adjacent said device and removing the same therefrom.

22. In a machine of the character described, in combination, a shaping device, means for feeding articles relative thereto, said means including a movable carriage, means for positioning articles below said carriage, means extending from said carriage for moving articles to be manipulated toward said shaping device and means operating a substantial interval in advance of said first named article engaging means, for engaging the shaped articles adjacent said device and removing the same therefrom.

23. In a machine of the character described, in combination, a shaping device, means for feeding articles relative thereto, said means including a movable carriage, article engaging means carried by and movable with respect thereto and adapted to feed articles to be manipulated toward said shaping device and means connected with said carriage for engaging the shaped articles and removing the same from said shaping device.

24. In a machine of the character described, in combination, a shaping device, means for feeding articles relative thereto, said means including a movable carriage, article engaging means carried by and movable with respect thereto and adapted to feed articles to be manipulated toward said shaping device and means connected with said carriage and also movable relative thereto, for engaging the shaped articles and removing the same from said shaping device.

25. In a machine of the character described, in combination, a shaping device, said machine being adapted to have articles positioned to one side of said device, a movable carriage and means connected with said carriage and extending above said articles, said means being engageable with one of the articles for moving the latter towards said shaping device.

26. In a machine of the character described, in combination, a shaping device, said machine being adapted to have articles positioned in operative association relative to said device, a movable carriage and means connected with said carriage and engagable with one of said articles for removing the same from said shaping device.

27. In a machine of the character described, in combination, a shaping device, a movable carriage, said machine being adapted to support articles to be shaped, and means associated with said carriage and movable in one path during a certain movement of said carriage and movable in another path during another movement of the same, whereby said means will fail to operatively engage said articles during the first movement of the carriage and will operatively engage and positively feed the same during the other movement thereof.

28. In a machine of the character described, in combination, a shaping device, a movable carriage, said machine being adapted to support articles to be shaped in advance of said device, and means associated with said carriage and movable in one path during a certain movement of said carriage and movable in another path during another movement of the same, whereby said means will fail to operatively engage said articles during the first movement of the carriage and will operatively engage and positively feed the same towards said shaping device during the other movement thereof.

29. In a machine of the character described, in combination, a shaping device, a movable carriage, said machine being adapted to support articles to be shaped in operative association with said device, and means associated with said carriage and movable in one path during a certain movement of said carriage and movable in another path during another movement of the same, whereby said means will fail to operatively engage said articles during the first movement of the carriage and will operatively engage and positively feed the same away from said shaping device during the other movement thereof.

30. In a machine of the character described, in combination, a shaping device, said machine being adapted to receive articles initially positioned in advance of said shaping device, a movable carriage, means connected with said carriage and adapted to be moved through a path wherein it will fail to operatively engage one of said articles during one movement of said carriage, and being further adapted during another movement thereof, to move through a path at which it will engage said articles and feed the same towards said shaping device, and further means also connected with said carriage and movable through a path wherein it will fail to operatively engage the articles positioned adjacent the shaping device during one movement of said carriage, and during another movement thereof being adapted to move through a path in which it will operatively engage said article to remove the same from said shaping device.

31. In a machine of the character described, in combination, a shaping device, means for feeding articles thereto, means positioned adjacent said shaping device and movable to positions at which it will co-operate with one of said articles to act as a stop therefor, and in which it will move to a position out of the path of feed of the articles respectively, and means for operating said last named means.

32. In a machine of the character described, in combination, a shaping device, means for feeding articles thereto, means positioned adjacent said shaping device and movable to positions at which it will co-operate with one of said articles to act as a stop therefor, and in which it will move to a position out of the path of feed of the articles respectively, and means connecting said gauging means with said feeding means whereby the movements of the latter will control certain of the movements of the former.

33. In a machine of the character described, in combination, a movable shaping device, means for feeding articles thereto, means positioned adjacent said movable shaping device and movable to positions at which it will co-operate with one of said articles to act as a stop therefor, and in which it will move to a position out of the path of feed of the articles respectively, and means connecting said gauging means with said movable shaping device, whereby the movements of the latter will control certain of the movements of the former.

34. In a machine of the character described, in combination, a shaping device, means for feeding articles thereto, means positioned adjacent said shaping device and movable to positions at which it will co-operate with one of said articles to act as a stop therefor, and in which it will move to a position out of the path of feed of the articles respectively, and means connecting said gauging means with said shaping device and feeding means respectively, whereby one of the movements of said gauging means is controlled by said shaping means, the other of the movements aforementioned being controlled by said feeding means.

35. A machine of the character described, including in combination, a fixed head and a bed movable towards and away from said head, dies carried by said bed, co-operating counter-dies carried by said head, and a movable plate carried by said head and positioned adjacent to said counter-dies, said plate being adapted to act to strip articles from the counter-dies carried by said head.

36. A machine of the character described, including in combination, a bed, a head, shaping devices associated with said head and bed respectively, a conveyor at one end of said bed and adapted to arrange articles to be shaped adjacent thereto, a feeding means for moving articles towards said shaping devices, means for operating said shaping devices, further feeding means for removing the shaped articles from said devices and means for conveying the shaped articles from said last named feeding means.

37. A machine of the character described, including in combination, a bed, a head, shaping devices associated with said head and bed respectively, a conveyor at one end of said bed and adapted to arrange articles to be shaped adjacent thereto, a feeding means for moving articles towards said shaping devices, movable gauging means acting as stops for said articles and arranged in a position adjacent the end of such movement, means for operating said shaping devices, further feeding means for removing the shaped articles from said devices, means acting prior to said further feeding means to remove said gauging means, and means for conveying the shaped articles from said last named feeding means.

38. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles.

39. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, and means adapted to limit the movement of each of said fingers from said deflected position.

40. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, a table reciprocal with and adapted to support said die, and an article gauge reciprocal with said table and movable thereon into and out of position projecting above said die.

41. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, a table reciprocal with and adapted to support said die, an article gauge reciprocal with said table and movable thereon into and out of position projecting above said die, and means adapted to actuate said gauge including a gauge actuating device actuated in one direction by movement of said reciprocatory device.

42. A machine of the character described including, in combination, a device automatically operative to feed articles to a predetermined position, a reciprocatory device to feed articles in succession from said position, a shaping die reciprocal transversely of the path or reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, a table reciprocal with and adapted to support said die, an article gauge reciprocal with said table and movable thereon into and out of position projecting above said die, a rock shaft on said table adapted to move said gauge, an arm on said shaft, a spring adapted to exert tension on said arm to hold said gauge either in or out of said projecting position, and a lever mounted on said table adapted to be actuated by said reciprocatory device to rock said arm in one direction.

43. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, a table reciprocal with and adapted to support said die, an article gauge reciprocal with said table and movable thereon into and out of position projecting above said die, a rock shaft on said table adapted to move said gauge, an arm on said shaft, a spring adapted to exert tension on said arm to hold said gauge either in or out of said projecting position, a lever mounted on said table adapted to be actuated by said reciprocatory device to rock said arm in one direction, a counter die with which said shaping die is adapted to cooperate to shape an article therebetween, and a device alongside said counter die for actuating said arm in the opposite direction to that effected by said reciprocatory device.

44. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, a table reciprocal with and adapted to support said die, an article gauge reciprocal with said table and movable thereon into and out of position projecting above said die, and an article conveyor reciprocal with said table disposed to receive the last mentioned article delivered from said die.

45. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, a table reciprocal with and adapted to support said die, an article gauge reciprocal with said table and movable thereon into and out of position projecting above said die, an article conveyor reciprocal with said table disposed to receive the last mentioned article delivered from said die, and said article gauge being movable on said table between said die and conveyor into and out of position projecting above said die.

46. A machine of the character described including, in combination, a device automatically operative to feed articles to a predetermined position, a reciprocatory device to feed articles in succession from said position, a shaping die reciprocal transversely of the path of reciprocation of said reciprocatory device and relative to said automatically operative feed device, said reciprocatory device including two article feeding fingers reciprocal therewith and arranged one ahead of the other and pivoted so as to be adapted to be deflected by the articles when moving to initial position to feed the articles, a table reciprocal with and adapted to support said die, an article gauge reciprocal with said table and movable thereon into and out of position projecting above said die, a rock shaft on said table adapted to move said gauge, an arm on said shaft, a spring adapted to exert tension on said arm to hold said gauge either in or out of said projecting position, a lever mounted on said table adapted to be actuated by said reciprocatory device to rock said arm in one direction, a counter die with which said shaping die is adapted to cooperate to shape an article therebetween, a device alongside said counter die for actuating said arm in the opposite direction to that effected by said reciprocatory device, and an article stripper close alongside said counter die and spring pressed toward the outer end of said counter die.

In testimony whereof I affix my signature.

JESSE E. TROUST.